Aug. 29, 1967   J. J. THAYER   3,338,483
BOW-FORMING MACHINES AND METHODS
Original Filed July 1, 1960   9 Sheets-Sheet 4
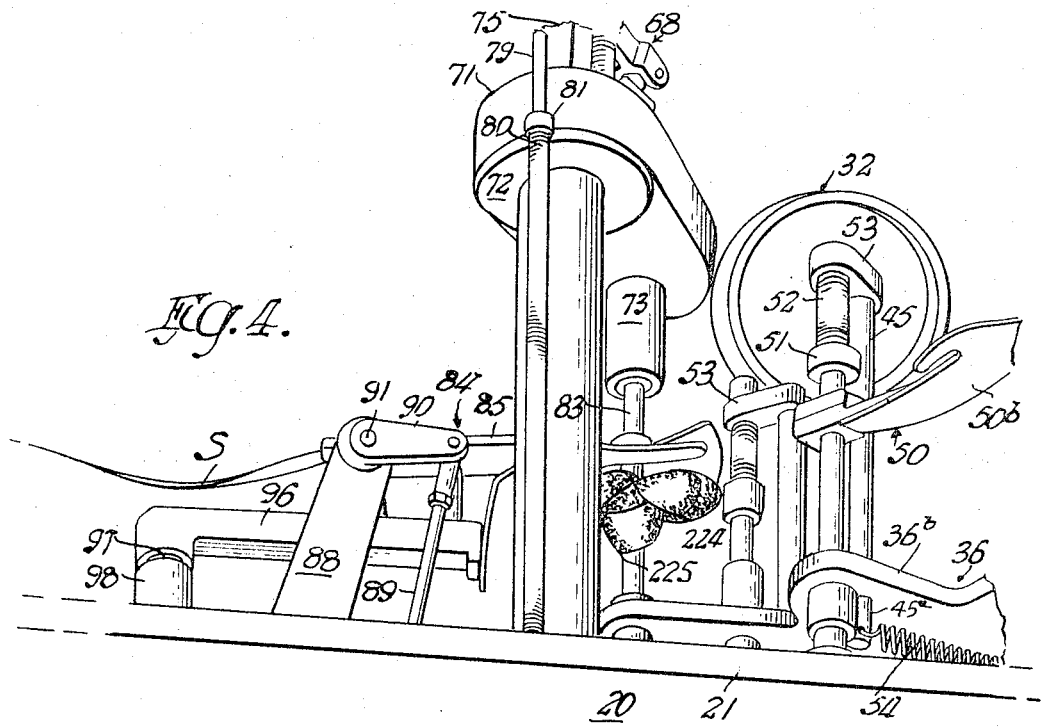
FIG. 4.
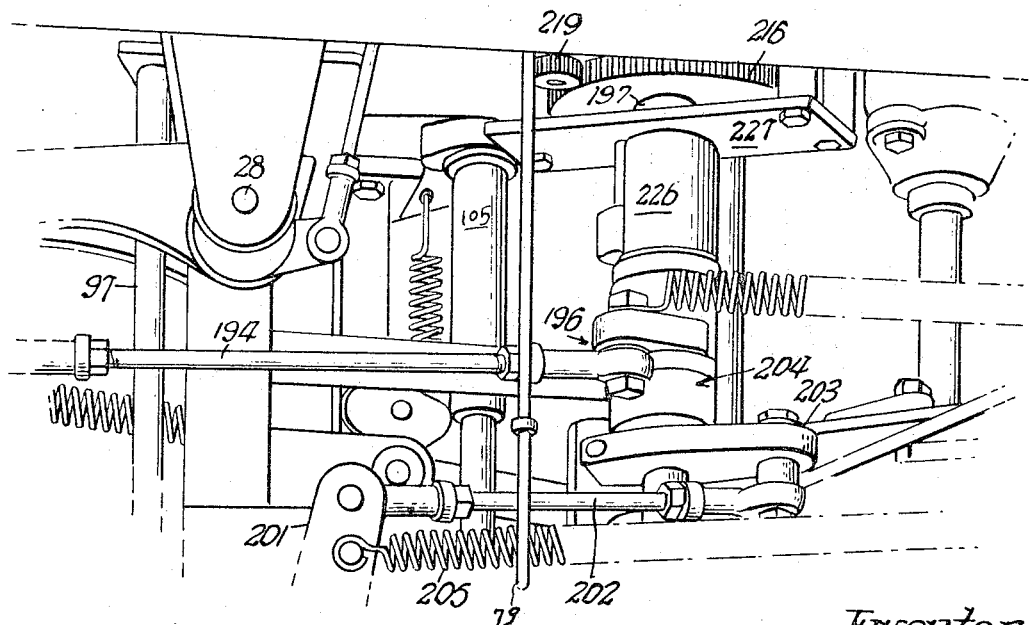
Inventor
Josephus J. Thayer
Pendleton, Neuman,
Seibold & Williams Attys Aug. 29, 1967 — J. J. THAYER — 3,338,483
BOW-FORMING MACHINES AND METHODS
Original Filed July 1, 1960 — 9 Sheets-Sheet 5
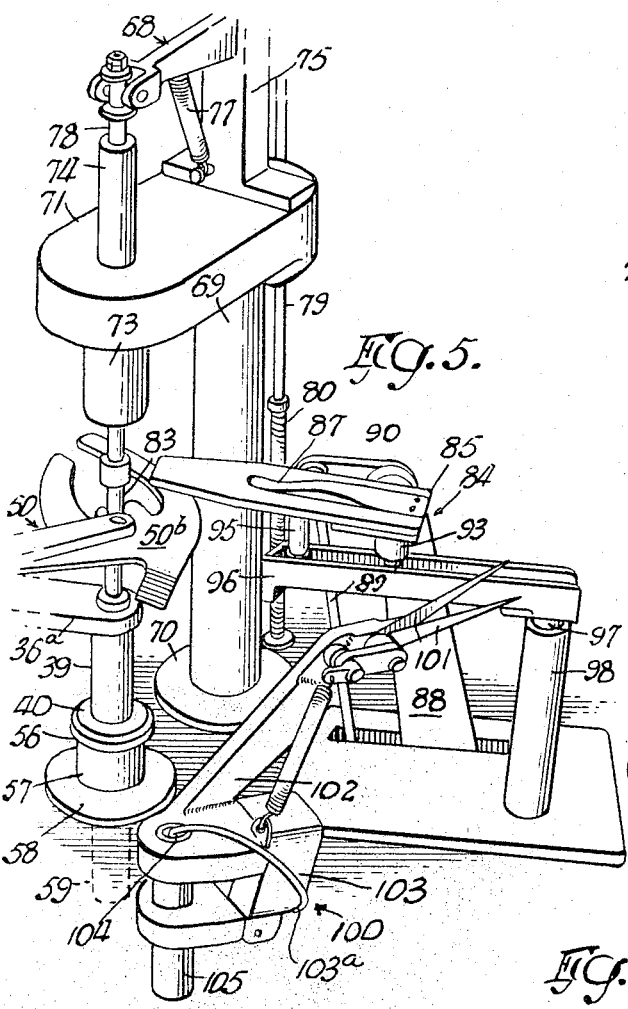
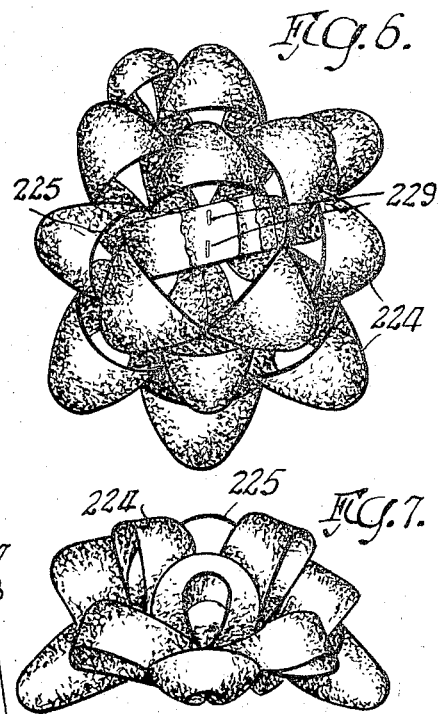
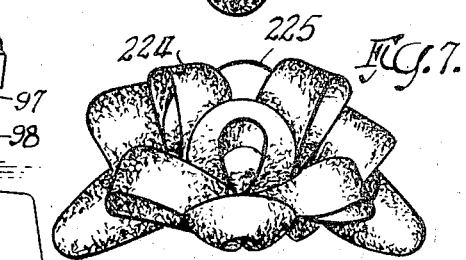
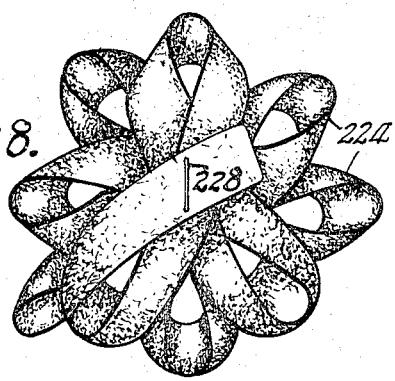
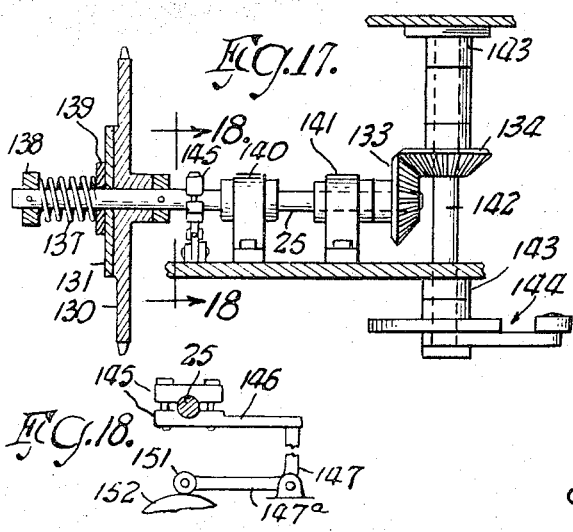
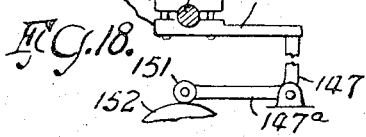
Inventor
Josephus F. Thayer
Pendleton, Neuman,
Seibold & Williams, Attys

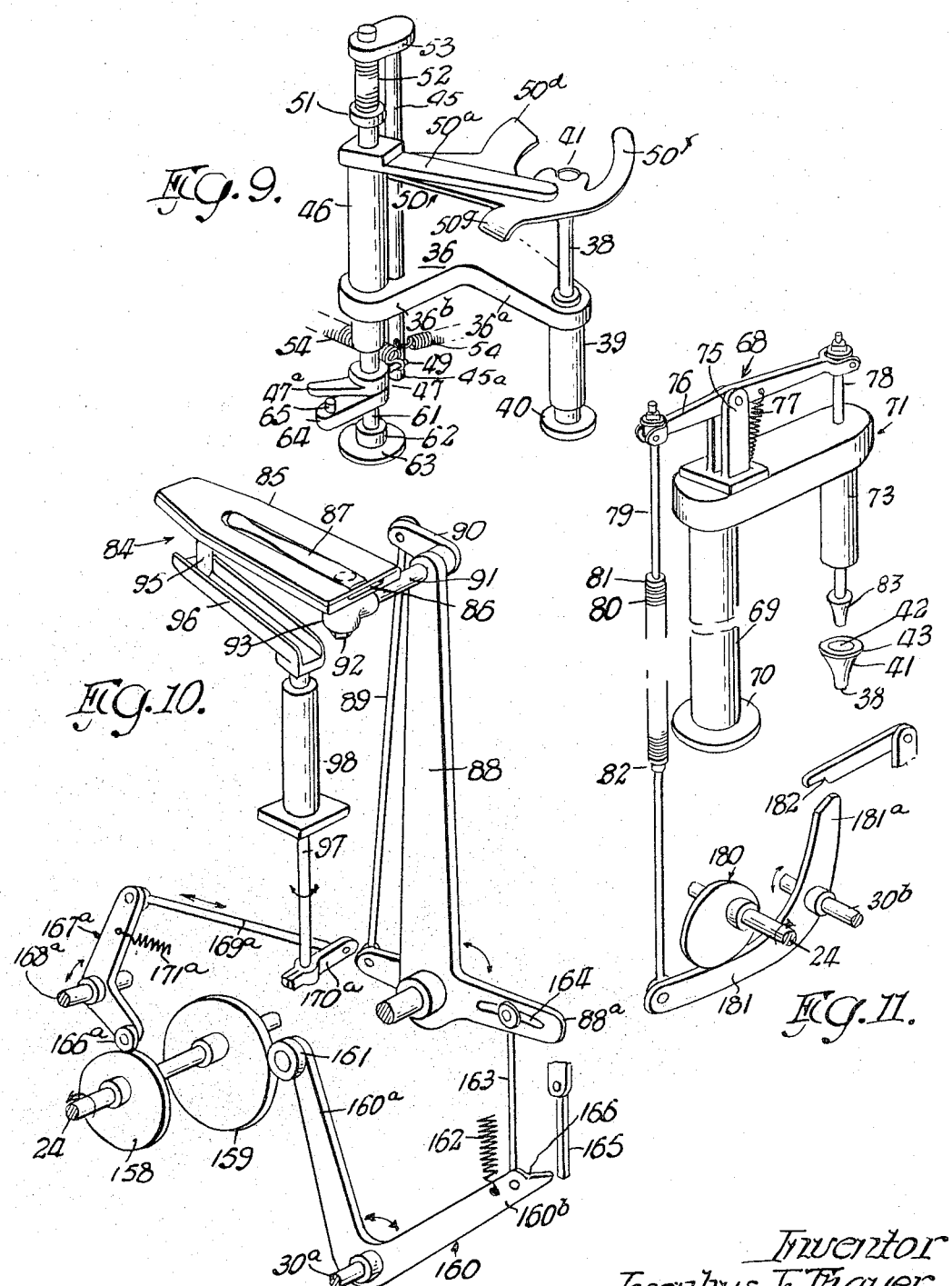

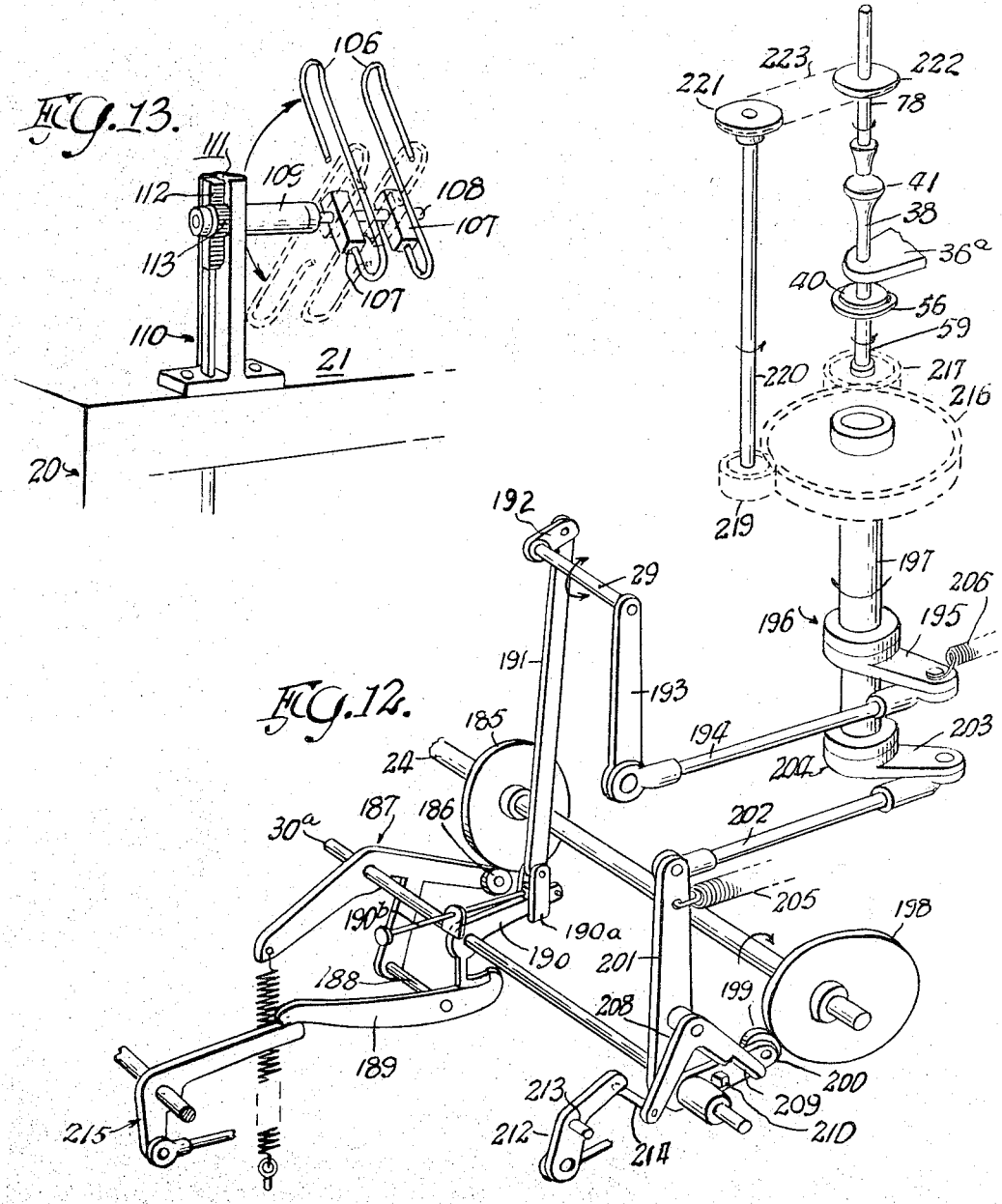

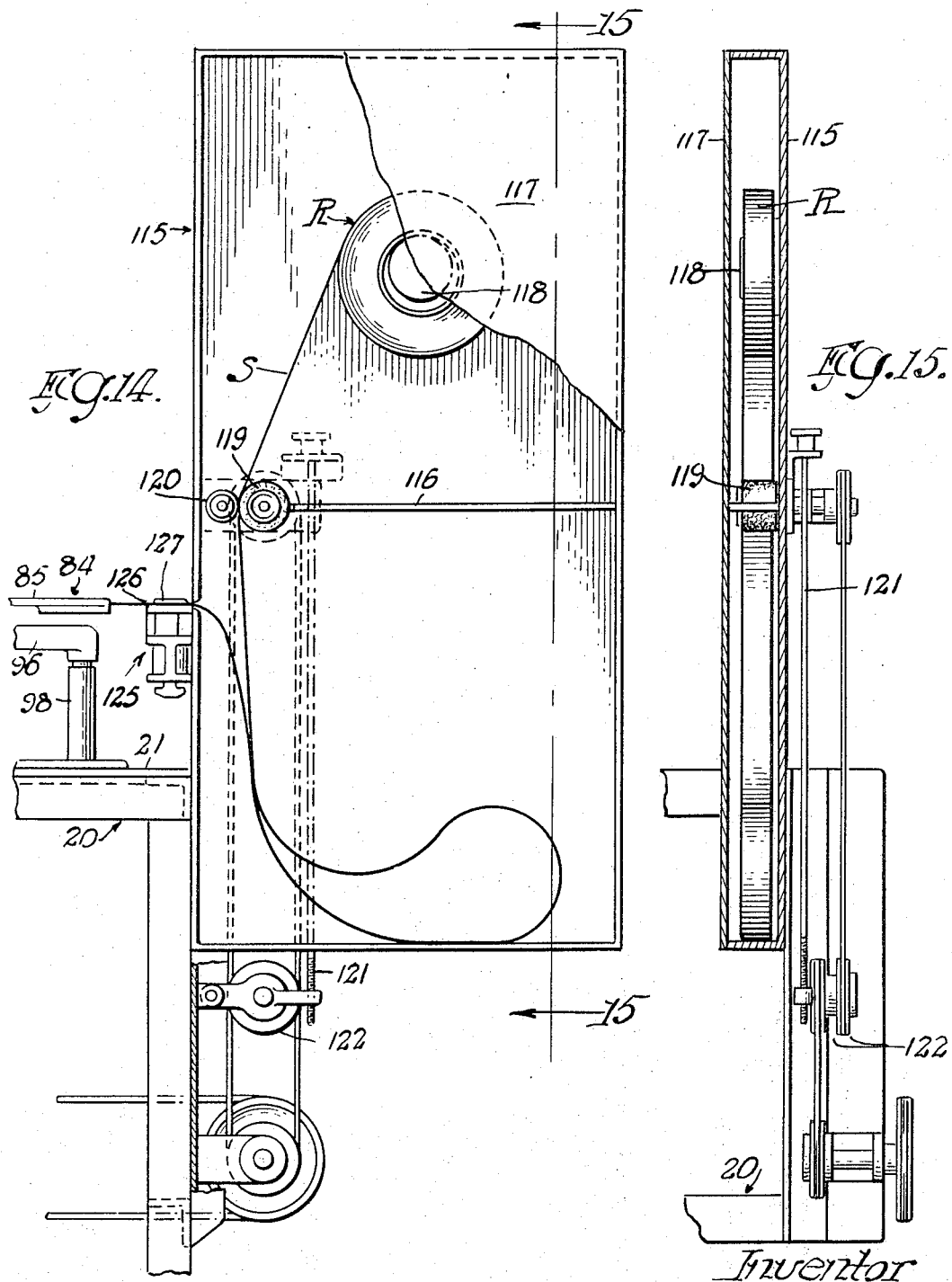

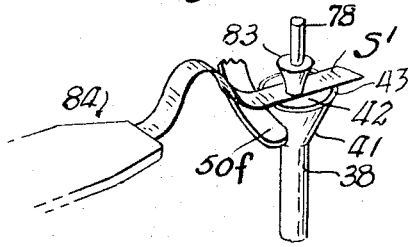
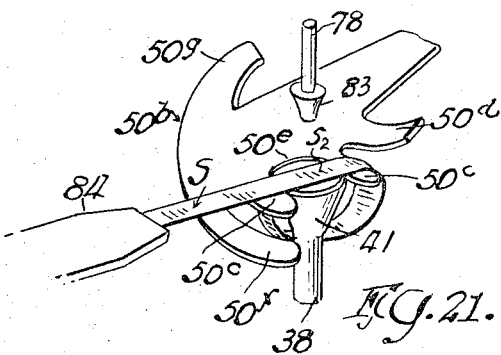
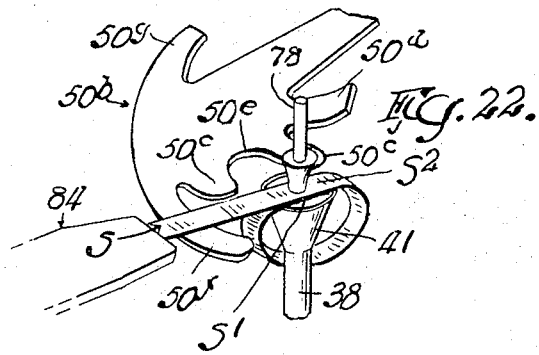
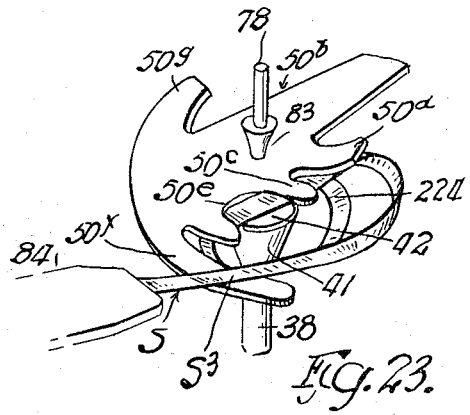
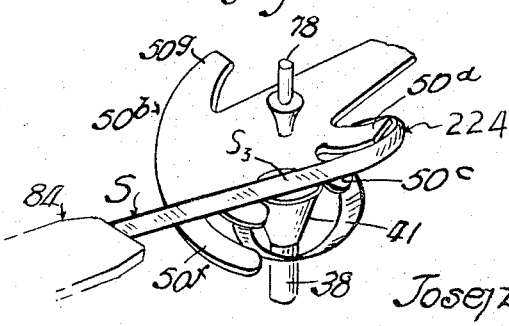

United States Patent Office 3,338,483
Patented Aug. 29, 1967

3,338,483
BOW-FORMING MACHINES AND METHODS
Josephus J. Thayer, West Lafayette, Ind., assignor to Thayer, Inc., Wolcott, Ind., a corporation of Indiana
Original application July 1, 1960, Ser. No. 40,439. Divided and this application Oct. 21, 1965, Ser. No. 499,740
45 Claims. (Cl. 223—46)

ABSTRACT OF THE DISCLOSURE

Four rotatable spindles and associated clamping members are mounted on a turret for successive cyclical movement to four positions, including, in order, a loop-forming position, a stapling position and a bow discharge position. A feed device extends successive lengths of ribbon over the top of a spindle in the loop-forming position in a direction generally normal to the axis of rotation of the spindle, and oscillates laterally of the direction of ribbon feed. A reciprocable and rotatable presser member clamps the ribbon on the top of the spindle at the loop-forming position as the spindle is rotated, to form a loop of each of the successively fed lengths of ribbon, and the respective clamping member clamps the ribbon on the spindle when the presser member is raised. The clamping member includes projecting fingers for guiding the ribbon and the loops during feeding of the ribbon and the forming of the loops. The spindle rotates about 360° in forming the first loop of a bow, to form a closed center loop extending downwardly beside the spindle, and rotates a lesser amount, e.g., about 225°, for forming additional loops of the bow. The clamping member retains the formed loops on the spindle as the turret is rotated to advance each of the spindles to its next position. While the loops of a bow are being formed on a spindle at the loop-forming position, a stapler drives a staple through the ribbon on the spindle at the stapler position, to permanently secure the loops together, the staple being driven against the top of the spindle, and a completed bow is discharged from the spindle at the discharge position.

---

This application is a division of my copending application, Ser. No. 40,439, filed July 1, 1960 and entitled, "Bow-Forming Machine."

A large and expanding demand for fancy decorative wrapping materials, accessories and ensembles has created a concomitant demand for the efficient and large-scale production of decorative bows. These bows, to best satisfy this demand, should present an individualistic and finished appearance such as is usually associated with special hand wrapping and tying techniques. One example of a bow exhibiting these characteristics to a high degree and which is enjoying a substantial current market demand is a multi-conoidal-point bow of the general type illustrated in FIG. 7 of U.S. Patent No. 2,841,905, issued to G. Wanchek on July 8, 1958. Among the features which have apparently contributed to the acceptance by consumers of bows having this particular configuration is the provision of a central closed loop which covers the area of crossing and securement of the loops, conceals the securing device, and contributes to the desirable finished and individualistic appearance of this bow.

As will be noted by a perusal of the Wanchek patent, as well as most of the remainder of the prior art in this field, prior methods of forming finished decorative bows of the above-described general character have been largely dependent on manual manipulation of the strip material during most or all of the formative steps. Some prior attempts have been made to mechanize these operations but these attempts have resulted largely in accessory-type equipment which mechanizes only one or a few of the forming steps, such as by retaining the loops in a predetermined position or mechanically winding strip material or both. Such methods of bow formation still require a great deal of manual labor and time and are clearly incompatible with high-volume efficient production of desirable decorative bows. There thus remains a demand for a machine which will mechanically form complete decorative bows having the characteristics outlined above. More particularly it appears to be highly desirable to provide a machine which will substantially completely mechanize a decorative bow-forming operation and which will rapidly and efficiently produce decorative bows having a finished appearance.

A consideration of the many steps of forming, securing, handling, packing, shipping, sale, package applications and finished decorated package handling to which bows may be subjected, particularly mass produced bows requiring shipment to retail outlets, will indicate the many opportunities for rough treatment and attendant disarrangement of the configuration of the bows and/or tearing or splitting of the strip material. Consequently, decorative bows should preferably be formed as stable as possible to insure maintenance of a designed configuration with a minimum risk of tearing and/or splitting of the strip material. For instance, in multi-loop bows wherein a particular relationship between the several loops is an essential element of a most desirable appearance, the loops of the bow should be effectively constrained against rotation relative to one another during the forming steps as well as during the subsequent handling steps to which the bows are subjected. Further, any perforation through the strip material should be of a minimum area to minimize or prevent splitting or tearing.

Referring again to the Wanchek patent for an illustration, it will be noted that the loops of the bow illustrated in FIGS. 7 and 8 therein are secured together by a length of material which passes through a relatively large single preformed aligned opening in each of the loop legs. Such bows, incorporating single pivot axis securing means, present a problem in maintaining the desired relationship between the individual loops. Thus, a machine intended for mechanically producing bows, and particularly a machine designed for high volume or mass production, should incorporate means for forming a stable bow, without splitting or tearing of the strip material, which will retain its configuration insofar as is practicable within the limits of strength and elasticity of the material being utilized.

It is an object of this invention to provide a bow-forming machine meeting the criteria outlined above.

It is an object of this invention to provide an improved machine for mechanically forming decorative bows from strip material.

It is an object of this invention to provide a machine for producing decorative bows from strip material with a minimum of manual labor or personal attention to the operation of the machine.

It is another object of this invention to provide an improved bow-forming machine for mechanized high volume production of finished decorative bows.

It is another object of this invention to provide a machine for forming a multi-loop bow having a center loop of a different configuration than the remainder of the loops.

A more specific object of this invention is to provide a machine for forming multi-conoidal-point decorative bows each including a central closed loop.

It is a further object of this invention to provide a machine for forming stable multi-loop decorative bows.

It is a further object of this invention to provide an improved strip-material supply apparatus for an intermittent feed mechanism.

It is a further object of this invention to provide a machine for producing bows which does not require pre-perforation of the strip material and wherein the size of any perforations of the strip material is kept to a minimum.

It is a further object of this invention to provide a machine for producing bows which does not require perforation of the strip material during the manipulative steps of formation of a bow.

These and other objects of this invention will become apparent to those skilled in this art upon a study of the following description, the drawings and the appended claims.

In carrying out this invention in one form, an automatic bow-forming machine is provided. More specifically, a bow-forming machine is provided which includes rotatable carrier spindles for engaging and rotating ribbon placed thereon, an intermittent feed device for feeding successive lengths of ribbon to said spindles to form loops of ribbon thereon, and a drive mechanism for the rotatable spindles and the feed means. The drive means actuates the feed means to feed successive lengths of ribbon to a spindle and cooperatively rotates that spindle through one full revolution during the feeding of one length of ribbon thereto and through a lesser angle of revolution during the feeding of each of several successive lengths of ribbon, and includes a spindle drive wherein a pair of one-way overriding drive clutches on a spindle-driving shaft provides the two different amounts of spindle revolution. The carrier spindles are mounted on a spider for movement through several operating positions to permit simultaneously carrying out several operations on successive bows at the various positions assumed by each spindle during one rotation of the spider. These several operations include the disposition and temporary securement of bow-forming loops on the spindles at a first position, maintaining securement of the loops during movement to succeeding positions, applying a staple or other permanent securing device at a second position, and discharging the completed bow at a third position. The spider is driven by a Geneva movement apparatus. The means for securement of the formed loops on the carrier spindles comprises a reciprocable presser spindle mounted for reciprocation and rotation in opposition to the carrier spindles in the first position and retaining hands which are mounted on the spider and which are rotatable and reciprocable into a retaining position in opposition to each of the carrier spindles.

For a more complete understanding of this invention, reference should now be had to the drawings wherein:

FIG. 4 is an enlarged side elevation view, partially in perspective, of a portion of the machine shown in FIG. 1;

FIG. 5 is another perspective view of a portion of the mechanism shown in FIG. 3;

FIGS. 6, 7 and 8 are top plan, side and bottom plan views respectively of a bow formed on the machine shown in FIG. 1, FIG. 6 showing the bow with a portion of the central loop broken away;

FIG. 9 is another perspective view of a portion of the mechanism shown in FIG. 3;

FIG. 10 is an enlarged perspective view, partially schematic, illustrating the drive arrangement for the feed mechanism of the machine in FIG. 1;

FIG. 11 is an enlarged perspective view, partially schematic, illustrating the drive arrangement for reciprocating the presser spindle of the machine in FIG. 1;

FIG. 12 is an enlarged perspective view, partially schematic, illustrating the drive arrangement for the rotatable spindles of the machine in FIG. 1;

FIG. 13 is an enlarged perspective view of the bow-discharge apparatus of the machine in FIG. 1;

FIG. 14 is an enlarged side elevation view, partially broken away, of the ribbon-supply apparatus of the machine in FIG. 1;

FIG. 15 is a sectional view taken along lines 15—15 of FIG. 14;

FIG. 16 is an enlarged cross-section view of a spindle-head;

FIG. 17 is a side elevation view, partially in section and partially schematic, illustrating the spider drive arrangement of the machine in FIG. 1;

FIG. 18 is a sectional view taken along line 18—18 of FIG. 17;

FIG. 19 is a partial back-elevation view of the machine of FIG. 1 showing the timing shaft and stapler drive arrangement, and FIGS. 20–24 illustrate certain steps in the formation of the loops of a bow on the machine in FIG. 1.

Figure 1:
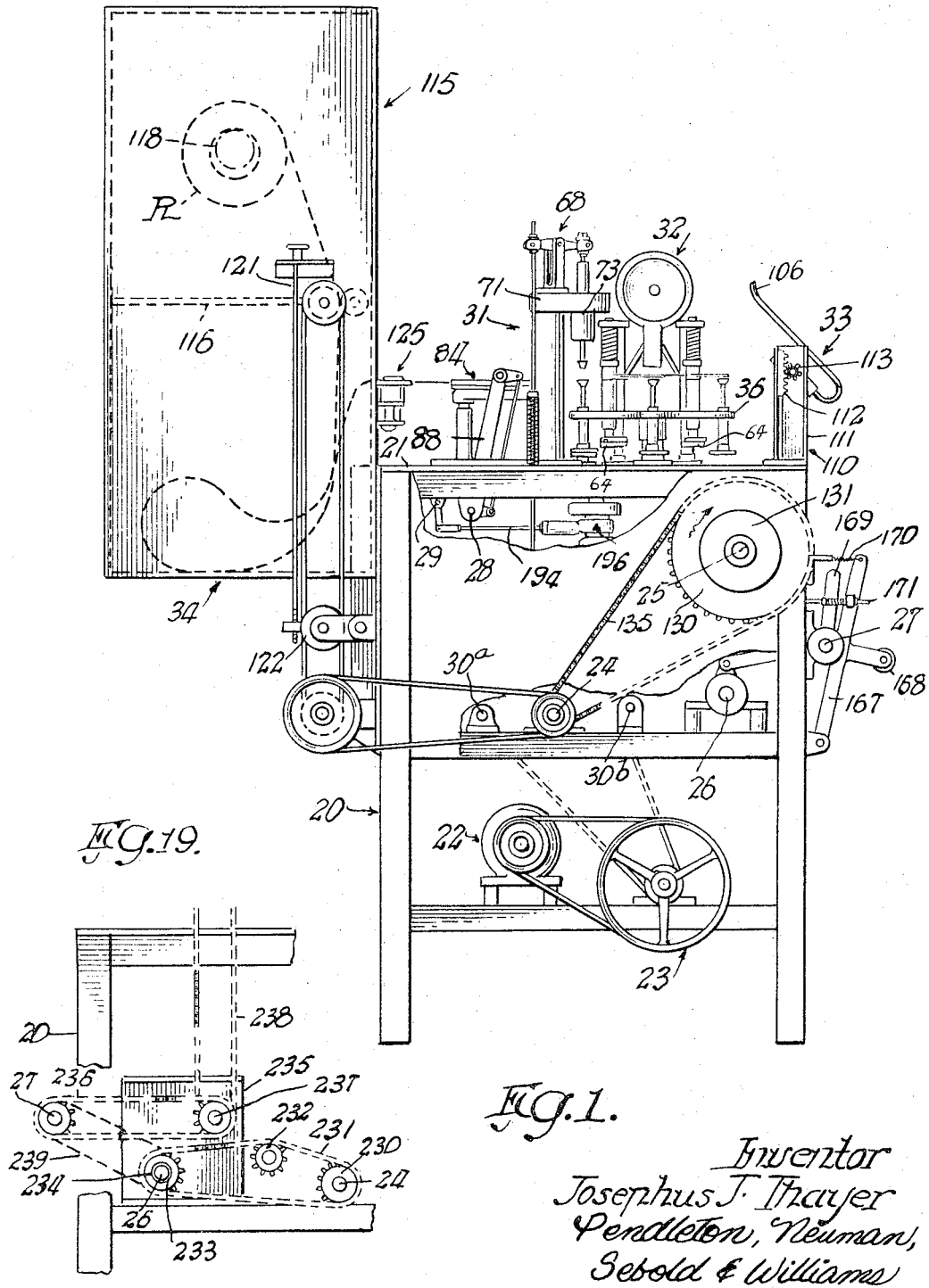
FIG. 1 is a front elevation view of a bow-forming machine employing the teachings of this invention.

Referring now to the drawings and more particularly to FIG. 1, the illustrated machine includes a generally rectangular frame 20 presenting a flat top supporting surface 21. Supported in the frame 20 is an electric drive motor 22, a speed-reduction drive 23, a main drive shaft 24, a spider drive shaft 25, timing shafts 26 and 27, and pivot shafts 28, 29 and 30 ($a$ and $b$). Also supported on frame 20, largely above top support surface 21, is the strip material-manipulating bow-forming mechanism indicated generally at 31 together with a stapler 32, a bow-discharge mechanism 33 and a ribbon-feed mechanism indicated generally at 34. Mechanism 31 includes a spider 36 and related apparatus mounted thereon, presser spindle apparatus 68, feed mechanism 84 and a scissors device 100 (FIG. 2).

Strip material manipulating mechanism

Figure 2:
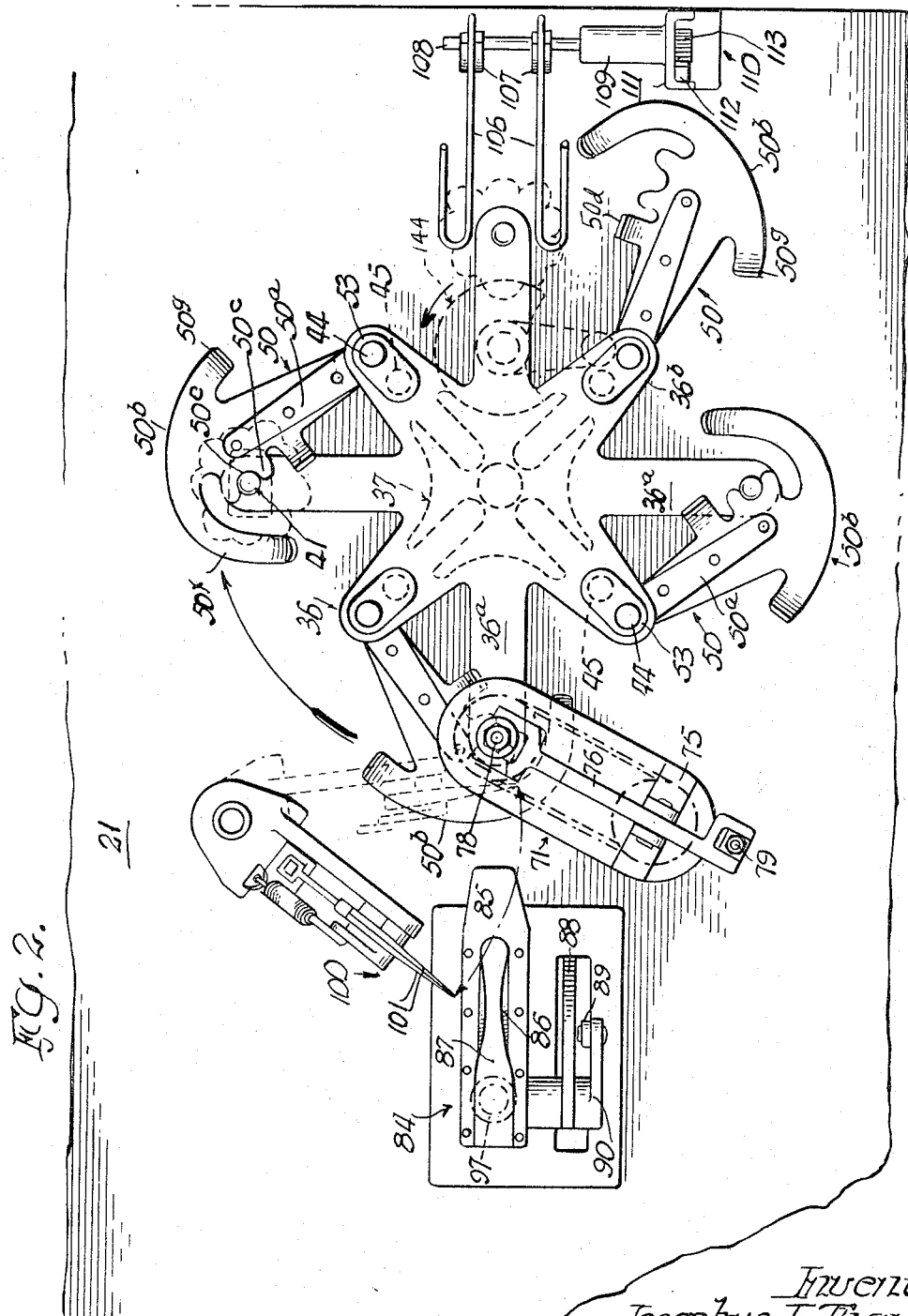
FIG. 2 is an enlarged top plan view of the strip material-manipulating machanism and bow-discharge apparatus of the machine in FIG. 1.
Figure 3:
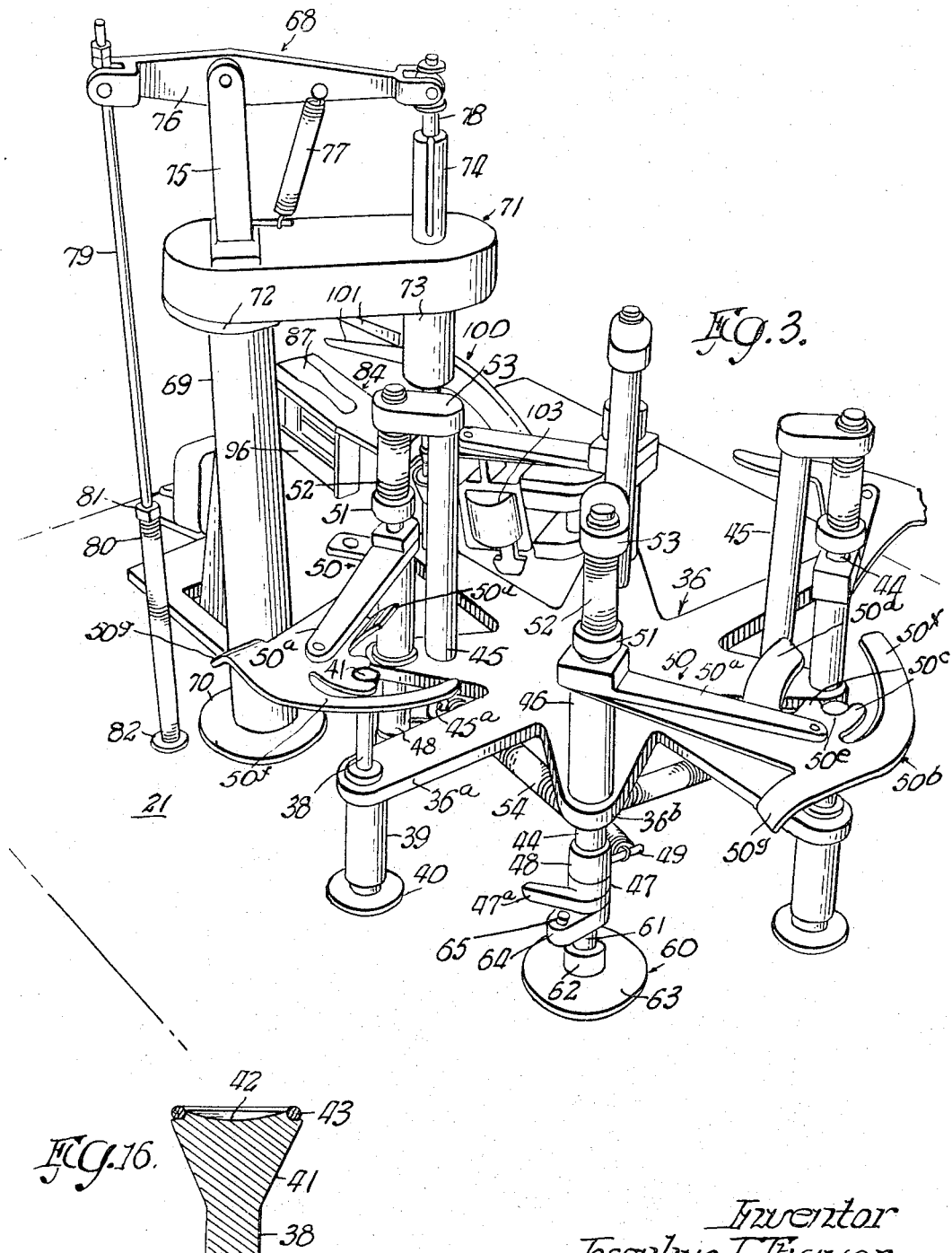
FIG. 3 is a perspective view of the mechanism shown in FIG. 2, but omitting the bow-discharge apparatus and showing one hold-down member in a changed position.

With continuing reference to FIG. 1 but referring also to FIGS. 2–5, a rotatably mounted spider 36 is driven from shaft 25 through a Geneva cross intermittent movement mechanism 37 shown in dotted lines in FIG. 2. Through this Geneva drive, the spider is rotatable to move the mechanism mounted thereon through several successive positions wherein the various bow-forming functions may be performed. Referring particularly to FIG. 3, a sleeve 39 is secured in the free end of each of spider arms 36a and rotatably mounted in the sleeve is a rotatable spindle 38. Each spindle 38 is provided at its lower end with a flat disk clutch plate 40 and at its upper end with a spindle head 41. Both of members 40 and 41 are secured to spindle 38 to rotate therewith. As shown more specifically in FIG. 16, the head 41 is provided with a slightly concave anvil surface 42 and a surrounding shoulder supporting an O-ring 43.

Each of spider arms 36b supports a vertically reciprocable and rotatably mounted shaft 44 and a companion fixed shaft 45. Shaft 44 passes axially through a mounting sleeve 46 fixed to the free end of arm 36b. Fixedly secured to the lower end of shaft 44 is a member 47 including an integral operating arm 47a. Immediately above the member 47, a collar 48 is fixed to shaft 44 and has a rigid extension 49 extending radially outwardly therefrom. A hold-down hand member 50, including an arm portion 50a and a multi-finger hand portion 50b, is secured to each of shafts 44 immediately above member 46. Collar 51 is secured to the shaft 44 above the point of securement of hand 50 and a spring 52 is maintained in a compressed condition between collar 51 and a crosshead 53 supported on companion fixed shaft 45. The crosshead rotatably and reciprocally receives the upper end of shaft 44. A tension spring 54 is secured at one end to radial arm 49 and at its other end to the fixed depending end 45a of another shaft 45. Compression spring 52, being confined between fixed member 53 and collar 51 mounted on shaft 44, resiliently urges this shaft towards a lower position wherein the hand portion 50b is in contact with spindle head 41 along shoulder 43. Tension spring 54 tends to rotate shaft 44, and consequently member 50, in a counterclockwise direction (as viewed from above). Depending end 45a of the adjacent shaft 45 intersects extension 49 and serves as a stop to limit the amount of counterclockwise rotation of shaft 44 and position hand 50 over spindlehead 41.

The hand portion 50b of member 50 includes a pair of curved fingers 50c defining therebetween an arcuate portion 50e adapted to engage a segment of shoulder 43 of the spindlehead. Finger 50d extends arcuately upward from the general plane of fingers 50c and serves as a guide for receiving thereunder a loose loop of strip material, urging the formed loops downwardly. An elongated curvilinear finger 50f is substantially co-planar with fingers 50c and is adapted to extend around a substantial segment of the periphery of the spindlehead on the side disposed toward the source of the strip material, as will be later discussed. Disposed oppositely of fingers 50c, d and f is a rearwardly and downwardly extending finger 50g.

As is apparent from the foregoing description, the mechanism mounted on arm 36a and the mechanism mounted on an adjacent arm 36b act in cooperation, and together form one subassembly of the strip material-manipulating mechanism, as shown in FIG. 9. Further reference to the drawings will illustrate that there are four of these subassemblies mounted on the eight arms 36a, 36b of the spider. The Geneva drive is a four-position movement thereby providing for movement of spider 36 through four fixed positions during one complete revolution or cycle of movement of the spider mechanism. In the illustrated machine, the drive arrangement for the Geneva movement causes spider 36 to rotate clockwise as viewed in FIG. 2. Arbitrarily, and for convenience only, the four positions of spider 36 will be denoted, in terms of the four positions of spindles 38, as the first (I), second (II), third (III) and fourth (IV) positions starting at the lefthand side of FIG. 2 and moving clockwise.

A complementary clutch plate 56 is disposed immediately beneath the position which a plate 40 assumes when the arm 36a on which it is mounted is in position I (see FIG. 5). The plate 56 is mounted on a drive shaft 59 which is rotatably and reciprocably supported in bushing 57 secured to the top support surface 21 via flange 58. Downward reciprocation of shaft 59 moves clutch plate 56 downwardly away from plate 40 during rotation of spider 36. Subsequent to the movement of an arm 36a into position I, clutch plate 56 is reciprocated to an upper position in friction-driving contact with plate 40. It will be appreciated that thereafter rotation of clutch plate 56 will cause rotation of spindle 38 and spindlehead 41. The lower surface of plate 40 or the upper surface of clutch plate 56 may be provided with a suitable friction-enhancing medium to assure efficient connection between these two members during their periods of contact.

Disposed beneath each of the position I and position III locations of a member 47 is a drive mechanism 60 mounted in a manner generally similar to clutch plate 56 (see FIGS. 3 and 9). Referring particularly to FIG. 3, each of these drive mechanisms includes a shaft 61 which is rotatably and reciprocally supported in a bushing 62 secured to the top support surface by an integral flange 63. Fixed to the upper end of shaft 61 is a driving arm 64 having an upwardly projecting stud 65 mounted on its free end. It will be appreciated that reciprocation of shaft 61 and arm 64 through a sufficient vertical distance will cause reciprocation of shaft 44 against the compressive force of spring 52. Further, stud 65 extends upwardly to a point above the plane of the lower surface of arm 47a whereby, upon rotation of shaft 61 in a clockwise direction (as viewed from above), stud 65 will contact arm 47a and cause rotation of shaft 44 against the yieldable torque force applied through arm 49 by tension spring 54. As aforedescribed, rotation and reciprocation of shaft 44 causes rotation and vertical reciprocation of hand member 50. It will thus be appreciated that vertical and rotary oscillation of shaft 61 will cause vertical and rotary reciprocations of the related member 50. The drive arrangement for member 47 provided at position I is the same as that shown at position III in FIG. 3, except that the hand member 50 is not rotated through as great an angle at position I as it is at position III. Note the retracted position at position III in FIG. 2 versus the retracted position at position I in FIG. 22. Shafts 61 are driven in their vertically reciprocatory and rotary oscillating movements by any suitable drive apparatus (not shown) in timed relation with the operation of the remainder of the mechanism, under control of timing shafts 26 and 27.

Referring now particularly to FIGS. 3 and 5, the presser spindle arrangement 68 is disposed adjacent position I and is supported on a hollow, cylindrical standard 69 secured to top support surface 21 through a flange 70. A drive transmission casing 71, supported on a second flange 72 at the top of standard 69, is provided with a pair of bushings 73 and 74 disposed coaxial with a spindle in position I. Fixed to and rising from the upper surface of casing 71 is a yoke 75 pivotally supporting a rocker arm 76. A tension spring 77 is secured to the arm of rocker arm 76 disposed toward bushing 74 and the opposite end of spring 77 is fixedly secured to casing 71 thus urging rocker arm 76 to rotation in a clockwise direction (as viewed in FIG. 3). A presser spindle 78 is rotatably and pivotally secured to rocker arm 76 and extends downwardly, in sliding rotatable engagement, through bushings 74 and 73. Pivotally secured to the opposite end of rocker arm 76 is a reciprocating rod or shaft 79 extending downwardly through the support surface 21 and connected to a reciprocating drive apparatus as will be later described in connection with FIG. 11. A compression spring 80 surrounds the portion of shaft 79 immediately above surface 21 and is contained between bushing 82 mounted on support surface 21 and stop member 81 secured to shaft 79, thereby urging shaft 79 upwardly and complementing the action of spring 77. A drive shaft and gearing for rotating presser spindle 78, in a manner more particularly described below in connection with FIG. 12, is disposed in housing 69 and casing 71. A presser foot 83 is secured to the lower end of spindle 78 in direct opposition to a spindlehead 41 in position I and is normally urged against this spindlehead by springs 77 and 80.

As also illustrated in FIGS. 1–5, but with particular reference to FIGS. 4 and 5, the feed apparatus indicated generally at 84 includes a shuttle bill 85 provided with a comparatively wide, shallow aperture 86 passing longitudinally therethrough (see FIG. 10). Aperture 86 opens through the upper surface of shuttle 85 over a portion of its length and a spring finger 87 extends into this open upper portion, against the bottom of the aperture, to serve as a gripper for strip material passing through aperture 86 from right to left as viewed in FIG. 5. Shuttle 85 is moved towards and away from a spindlehead in position I by a parallelogram drive mechanism including pivotally connected drive arm 88, parallel arm 89 and crank arm 90, together with transverse shaft 91 fixed to arm 90. Bill 85 is fixed to shaft 91 via a pivot pin 92 which is vertically disposed and rotatably mounted in bushing 93 secured to the end of shaft 91 (see FIG. 10). This mounting permits oscillation of bill 85 about the axis of pin 92 but prevents rotation of the bill about the axis of shaft 91. Oscillation of the bill 85 about the axis of pin 92 is controlled by a stud 95 fixed to the free end portion of the bill. This stud depends into an open channel member 96 which is in turn mounted on the upper end of shaft 97 rotatably supported in a bushing 98 secured to upper support surface 21. Stud 95 is freely received in channel 96. It will be appreciated that rotary oscillation of shaft 97 will cause rotary oscillation of channel member 96 which in turn engages stud 95 and causes a cooperative oscillation of bill 85 in a generally horizontal plane.

Mounted on support surface 21 adjacent position I is a cutting mechanism comprising a solenoid-actuated scissors device 100 (see FIGS. 2 and 5). This device includes a pair of opposed cutting blades 101, one of which is mounted in fixed position relative to a support 102 and the other of which is rotatably mounted to be actuated by solenoid 103. The entire scissors mechanism is supported on a hollow shaft 104 which is rotarily supported in a bushing 105 mounted on support surface 21. An electrical conductor 103a extends upwardly through shaft 104 and is connected to the solenoid. Counterclockwise rotation of shaft 104 (as viewed from above in FIG. 2) through a proper degree of rotation will rotate the scissors apparatus from a standby position illustrated in FIG. 5 and in full lines in FIG. 2, to a cutting position indicated in dotted lines in FIG. 2. In the cutting position the blades are disposed astraddle strip material extending from bill 85 over the top of spindlehead 41. With the device 100 in the cutting position, actuation of the solenoid 103 through conductor 103a causes closing of the scissors blades and consequently cutting of the strip material adjacent spindlehead 41. The desired oscillation of shaft 104 may be obtained by a conventional drive (not shown) controlled by timing shafts 26 and 27. Similarly, the electrical actuation of solenoid 103 may be controlled by mechanism operated by timing shafts 26 and 27.

Stitching mechanism 32 is a conventional securing device which applies a two-prong staple. A suitable stapler is one denoted as the "Monitor Stitcher" manufactured and sold by W. R. Pabich Mfg. Co. of Chicago, Ill.

Bow-discharge mechanism

Bow-discharge mechanism 33 (see FIGS. 1, 2 and 13) is disposed adjacent position III and comprises a pair of spaced parallel bent-rod members 106 secured to blocks 107 which are in turn mounted on a transverse shaft 108 for rotation therewith. The shaft 108 is journalled in a bushing 109 fixed to an upright support 110 which is in turn fixed to flat support surface 21. Support 110 includes a hollow channel or passageway 111 extending longitudinally therethrough. A rack 112 is vertically reciprocable in channel 111 and engages a pinion 113 which is fixed to an end portion of transverse shaft 108. Vertical reciprocation of rack 112 causes rotary oscillation of shaft 108 and concomitant rotary oscillation of arms 106. The full-line position of the arms 106 shown in FIGS. 1 and 13 is the discharge position, the arms being caused to assume the dotted-line position in FIG. 13 prior to a change in position of spider 36 which will bring a bow-carrying spindlehead 41 to position III. Timed reciprocation of rack 112 is obtained through a drive apparatus (not shown) controlled by the timing shafts 26 and 27. Subsequent to the moving of a spindlehead 41 to position III, the arms 106 are caused to rotate from their dotted-line position to their full-line position, as shown in FIG. 13, thus picking a bow off the top of spindlehead 41 (see FIG. 2) and raising it on arms 106 until it slides off to the right (FIG. 1) and is thus discharged from the machine.

Strip material supply arrangement

Referring now to FIGS. 1, 14 and 15, the strip material supply mechanism includes a large, narrow, rectangular enclosure 115 divided into two compartments by a transverse partition 116. One wall 117 preferably comprises a door which is hinged to the remainder of the enclosure to provide access to the two compartments and which is transparent to permit observance of the material contained therein by the operator of the machine. Secured to one wall of the enclosure 115, in the upper compartment, is a stud 118 centrally positioned to receive thereon a roll R of a continuous length of strip material. Opposed rollers 119 and 120 are disposed between the two compartments of the enclosure and constitute a flexible drive roller 119 and a presser roller 120 selectively positionable to maintain strip material S in driving contact with the roller 119. Roller 119 is driven by a belt-and-pulley arrangement extending from drive shaft 24 as indicated. Rotatable adjustment rod 121 controls the setting of variable cone pulleys 122 in this drive train to vary the rate of feeding of strip material through the rollers 119 and 120. The strip material is pulled from a supply roll R and deposited in large, loose folds in the lower compartment of the enclosure 115. Providing loose folds of material from which the feeding mechanism may withdraw the material to be utilized permits the use of a comparatively delicate gripper mechanism 87 with attendant minimum danger of causing damage to the ribbon passing thereunder during the return strokes of the feeding mechanism, such as might occur if this gripper were of a sufficient strength to unwind the material directly from a heavy supply roll. This ribbon supply arrangement also overcomes the problem of overrun of the supply roll which is normally attendant upon an intermittent or interrupted type feed such as is embodied in the illustrated machine. A solenoid-actuated-clamp type braking device 125 is mounted at one edge of enclosure 115. This device is provided with a slot 126 through which the strip material passes in traversing from the compartment to the feed mechanism 84. Actuation of the solenoid causes reciprocation of upper plate 127 to clamp the ribbon in slot 126 for purposes to be later described.

Drive apparatus

Mechanical arrangements for obtaining the required motions of certain of the basic portions of the strip-material-manipulating mechanism are somewhat schematically illustrated in FIGS. 10, 11, 12, 17 and 18.

Referring to FIGS. 1, 17 and 18, the drive train to the driving arm of the spider-rotating Geneva gearing includes a sprocket gear 130, opposed clutch plate 131, drive shaft 25 and bevel gears 133 and 134. The sprocket gear 130 is journalled for free rotation on shaft 25 and is driven by a roller chain 135 from drive shaft 24. Clutch plate 131 is keyed to shaft 25 to prevent rotation of the plate relative to the shaft while permitting the plate to slide longitudinally of the shaft. A compression spring 137 is mounted between collar 138, secured to shaft 25, and bearing washer 139 which is freely slidable on the shaft. The compression spring thus urges one surface of the clutch 131 into frictional contact with the adjacent surface of sprocket gear 130 which is in turn journalled on shaft 25 in a suitable manner to resist the axial thrust of the spring 137. Shaft 25 is supported in bearings 140 and 141 and is provided on its end opposite collar 138 with bevel gear 133 which is in driving connection with bevel gear 134. Gear 134 is in turn secured to rotatable shaft 142. Shaft 142 is journalled in bearings 143 secured on frame 20 and is drive-connected at its lower end to the driving arm 144 of the Geneva movement of spider 36. Rigidly secured to shaft 25, as by blocks 145, is a latch arm 146. A cooperating bell-crank latch member 147 is positioned to engage arm 146 to prevent clockwise (FIG. 18) rotation of the arm and thus to prevent rotation of shaft 25. With members 146 and 147 in the locked position illustrated in FIG. 18, shaft 25 is held against the driving force transmitted through the friction-connected of clutch plate 131 and sprocket gear 130. This lock or stop arrangement permits constant rotation of sprocket gear 130 while interrupting the drive to the Geneva gearing. The follower arm 147a of the bell-crank member carries a cam follower roller 151 positioned to be engaged by edge cam 152 secured to timing shaft 26. Once during each revolution of shaft 26 cam 152 rotates member 147 in a clockwise direction (as viewed in FIG. 18), whereby latch member 147 is disengaged from arm 146 permitting shaft 25 to rotate. Cam 152 thereupon permits the latch member 147 to return to the position illustrated in FIG. 18, and arm 146 is re-engaged upon completion of a single revolution.

The drive mechanism for the strip material feed means, shown in FIG. 10, is operated by a pair of edge cams 158 and 159 fixed to main drive shaft 24. A bell crank arm 160, pivotally mounted on pivot shaft 30a, carries at one end 160a a roller cam follower 161 positioned in running contact with edge cam 159. A tension spring 162 is connected to the opposite end of member 160 to provide a counter-rotational force maintaining follower 161 in contact with cam 159. A connecting rod 163 is pivotally secured at one end to arm 160b and has its opopsite end adjustably connected to an integral extension 88a of drive arm 88 in arcuate slot 164. The stroke of the feed mechanism may be varied by adjusting the point of connection of connecting rod 163 in slot 164, thereby changing the effective lever arm between this point of connection and pivot shaft 28 on which lever 88 is mounted. It will be appreciated that rotation of cam 159, in combination with the tensile force applied by spring 162, will cause reciprocation of feeding bill 85 via the mechanism shown in FIG. 10 and just described. A latch finger 165 is positioned to engage a surface 166 on arm 160b to selectively maintain the feed bill in a retracted position. Movement of latch finger 165 is controlled by mechanism cooperating with the timing shafts. One suitable control arrangement is shown in FIG. 18 and another basic type is illustrated at the right side of FIG. 1 wherein follower arm 167 carries a cam follower roller 168 positioned to be engaged by finger edge cam 169 secured to timing shaft 27. Cam 169, when contacting roller 168, rotates member 167 in a clockwise direction (as viewed in FIG. 1) against the force of tension spring 170. A connecting rod 171 secured at one end to arm 167 is thus reciprocated, and this motion may be utilized, directly or through suitable linkages, to move a trip latch, such as 165, or to provide other periodic motions described in the operation of the machine. Of course, the configuration of the cam 169 determines the characteristics of the motion imparted to rod 171.

Lateral oscillation of the feeding bill is obtained through a roller cam follower 166a in contact with cam 158, bell crank lever 167a mounted on a fixed shaft 168a, connecting rod 169a, and arm 170a which is fixed to the lower end of shaft 97. A tension spring 171a maintains follower 166a in contact with cam 158 and causes oscillation of channel member 96 in a direction opposite to the direction of oscillation positively imparted by the raised portion of cam 158. Oscillation of the feeding bill is automatically minimized or eliminated during the periods it is locked in a withdrawn position as stud 95 is then in or near a position of axial alignment with shaft 97.

FIG. 11 illustrates a cam-driven arrangement for reciprocating presser spindle 78 including a drive cam 180, mounted on main drive shaft 24, which cooperates with the upper surface of crank arm 181 to urge rod 79 downwardly against the action of compression spring 80. It will be appreciated that upon rotation of the edge cam 180 to a position in which its low point opposes arm 181, compression spring 80 will return rod 79 to an upper position. Crank arm 181 is pivotally mounted on pivot shaft 30b and includes an extension 181a adapted to engage a latch 182. Latch 182 is selectively movable into engaging relation with extension 181a thereby to maintain arm 181 at or near its extreme counterclockwise (as viewed in FIG. 11) position and thus maintain presser spindle 78 in a raised position. Operation of latch 182 is controlled by one of the timing shafts in a manner suggested above in discussing latch 165.

FIGS. 4 and 12 illustrate a one-way overrunning clutch drive arrangement for obtaining the desired rotary motion of spindle shafts 38. Edge cam 185 is fixed to main drive shaft 24 in driving relation with a roller follower 186 on crank 187 which is pivotally mounted on pivot shaft 30a. On a depending arm, crank 187 carries a stud 188 pivotally mounting a latch member 189. A second latch member 190 is cooperatively engaged with latch member 189 and is pivotally mounted on shaft 30a. A pair of link arms 191 and 192 are connected to the free end of latch member 190 and to pivot shaft 29 to effect oscillation of the latter in response to oscillatory movement of member 190. Link 191 is adjustably connected to member 190 through a slidable saddle 190a and an adjusting screw 190b. Depending from shaft 29 is a further link 193 pivotally carrying at its lower end one end of connecting rod 194. The opposite end of connecting rod 194 is pivotally secured to operating arm 195 of a one-way overrunning clutch mechanism 196, the driven portion of which is secured to shaft 197. Through clutch 196 movement of operating arm 195 in a clockwise direction, as viewed from above, causes concomitant rotation of spindle drive shaft 197, while reverse rotation of arm 195, under the influence of a tension spring 206, does not counterrotate shaft 197. The angular throw of arm 195 per revolution of cam 185 may be varied by adjusting the effective lever arm between shaft 30a and saddle 190a by manipulation of member 190b. An auxiliary drive mechanism derives its impetus from edge cam 198, also mounted on drive shaft 24, and is operative through roller cam follower 199 on crank arm 200 pivotally mounted on pivot shaft 30a, a second crank arm 201 independently pivotally mounted on pivot shaft 30a, connecting rod 202 and operating arm 203 of a second one-way overrunning clutch 204. The driven portion of clutch 204 also is secured to shaft 197. Tension spring 205 operates to bias the auxiliary drive mechanism towards one extreme of oscillation. Crank arm 201 is driven only when bell crank latch 208 thereon is positioned with its shoulder 209 in engagement with stud 210 on arm 200. With the latch 208 so engaged, rotary oscillation of arm 200 is transmitted to arm 201 whereby operating arm 203 is driven. Bell crank latch 208 is selectively positioned through a second bell crank trip member 212 pivotally mounted on a stationary shaft 213 and engaging a stud 214 mounted on the free end of crank 208. The position of member 212 is controlled by the timing shafts through a suitable cam driven arrangement. The engagement between latch members 189 and 190 is also controlled by a trip arrangement, indicated generally at 215, which is in turn controlled by the timing shafts. Trips 212 and 215 may be operated in a manner suggested above in discussing latch 165.

Rotation of spindle drive shaft 197 drives gear 216, a cooperating gear 217, and the shaft 59 which carries plate 56 at its upper end. Gear 216 also drives a second cooperating gear 219 mounted on the lower end of a drive shaft 220 which extends upwardly through the ollow center of support standard 69. At its upper end shaft 220 carries a gear 221 which is connected to another gear 222 on spindle shaft 78 by a roller chain or gear train at 223 within drive casing 71. Gear 222 is keyed to shaft 78 to cause rotation of the shaft as the gear rotates but is slidably disposed to permit relative vertical reciprocation of the spindle shaft 78 therethrough.

The size of cam 185 and the design of the linkage connecting this cam to operating arm 195, as well as the ratio between the various drive gears, is such that rotation of cam 185 simultaneously rotates carrier spindle 38 and presser spindle 78 through the angle of rotation necessary to form a single desired loop of ribbon. Cam 198 and the related drive linkage is designed to move operating arm 203 through a throw angle greater than the throw of arm 195 effected upon rotation of cam 185. Thus, when the drive linkage is completed from cam 198 to arm 203, the resulting oscillation of arm 203, during a single rotation of shaft 24, will drive the two spindle shafts through a greater angle of rotation than would result from the oscillation of arm 195. Latch 189, 190 is normally engaged whereby each revolution of drive shaft 24 and cam 185 causes the revolution of the spindle shafts through clutch 196, whereas the latch mechanism 209, 210 is normally out of engagement and rotation of the cam 198 thus normally has no effect upon the rotation of the spindles. Both latch mechanisms may be simultaneously held open to prevent any rotation of the spindles during certain steps of the bow-forming operation and may be selectively engaged in a desired timed relationship to provide different angles of rotation for forming successive loops. In a preferred embodiment, found to produce a highly satisfactory bow, the drive mechanism related to cam 185 rotates spindle 38 through an angle of rotation of 225° during each revolution of shaft 24 to form loops 224 (FIGS. 6–8) and the drive arrangement originating from cam 198 is designed to provide a 360° angle of rotation to form a single central loop 225 in each bow.

Latch mechanism 189–190 may be disconnected during operation of the 360° drive arrangement. However, this is not necessary in the illustrated machine as cam 198 is positioned to actuate arm 200 at the same time as cam 185 actuates crank 187. As one-way clutch 204 has a greater angle of throw than clutch 196, the greater throw of clutch 204 will prevail during simultaneous actuation of the two to thus provide the angle of rotation usual to actuation of clutch 204, regardless of the actuation of clutch 196.

Referring particularly to FIG. 4, the spindle drive shaft 197 passes through a hollow, cylindrical collar 226 mounted on plate 227 which is in turn secured to support surface 21 of frame 20. A continuously engaged friction drag brake (not shown), of conventional design, engages the upper surface of gear 216 to prevent overrun of the spindles at the end of the driving strokes of the clutch-operating arms. The friction brake should include a reasonable convenient adjusting arrangement to permit compensating adjustments for various operating conditions.

Timing shafts 26 and 27 are driven from drive shaft 24 by a positive drive illustrated in FIG. 19. A sprocket 230 on shaft 24 drives a roller chain 231 which passes over a tightener-idler 232 and drives sprocket 233 secured to sleeve 234 journalled on shaft 26. Sleeve 234 drives a speed reduction gear train in transmission 235 which in turn drives timing shaft 26. Another roller chain 239 is driven from shaft 26 and drives timing shaft 27 at the same rotational velocity. Roller chain 236 is driven from shaft 27 and drives a stub shaft 237 which in turn drives roller chain 238. Chain 238 drives the stapler mechanism 32.

One full revolution of timing shafts 26 and 27 corresponds to a bow-forming cycle. As each revolution of drive shaft 24 normally operates the spindle-rotating and feed mechanisms through one loop-forming cycle, the speed ratio established between timing shafts 26 and 27 and main drive shaft 24 governs the number of loops which will be included in each bow. One additional factor to be allowed for in choosing the drive shaft-timing shaft drive ratio is an allowance for "dead time" during movement of the spider from one position to another. In the illustrated machine, this movement is accomplished in a period of 3 revolutions of drive shaft 24. Shafts 26 and 27, in the present embodiment, are both rotated at the same speed and thus may be considered as being effectively a single timing shaft.

Operation

A bow-forming operation for preparing the bows shown in FIGS. 6–8 will be described following the various steps carried out at the different positions. It is assumed that strip material S has already been threaded between rollers 119 and 120, through clamping device 125, and through the feeding bill 85 beneath the gripper 87. Further, it is assumed that latches 147 and 208 are both in engagement.

Considering the basic operation at position I, as illustrated in FIGS. 20–25, rotation of main drive shaft 24 by motor 22 first raises the presser spindle 78. While the presser spindle is in a raised position, the feeding bill 85 is reciprocated forwardly towards the carrier spindle in position I and transversely oscillated to swing the end of strip material S from right to left (as viewed from the left side of FIG. 2) over spindlehead 41 and beneath presser foot 83. The presser spindle is then lowered to grip the end of ribbon S against spindlehead 41 whereby rotation of the spindles will cause rotation of the strip material. Feeding bill 85 retreats, with the gripper 87 readily permitting the material to slide relative to the bill. As the feeding bill starts its next movement toward the spindles, the finger 87 snubs the material in the bill and pulls a length of material from the lower chamber of the enclosure 115, thus creating a slack length of ribbon between the point of gripping on the spindles and the free end of the feeding bill, as seen in FIG. 20. At this time, the latch mechanism 209–210 being in engagement, cam 198 causes rotation of the spindles through a 360° revolution. During this revolution, feeding bill 85 is first transversely oscillated to the right while moving forwardly towards the spindle and then, as it reaches its forward limit of movement, it is oscillated to the left, toward the spindle. Meanwhile, hand member 50 rotates into position over the spindlehead and moves downwardly whereby the arcuate portion 50e clamps the first end $S_1$ of the ribbon against O-ring 43 as the spindles come to a stop. The presser spindle is then raised and feeding bill 85, completing its approach, oscillates to the left, passing the portion $S_2$ of the ribbon adjacent the free end of the bill over fingers 50c and f and beneath upraised guide finger 50d, between the ribon already clamped on spindlehead 41 and the raised presser foot (see FIG. 21). A 360° loop 225 is thus formed with the inside of its base atop the spindlehead and the body of the loop extending downwardly at one side of the spindle shaft (see also FIG. 4). The presser spindle is then lowered, gripping the ribbon portions $S_1$ and $S_2$ disposed between spindlehead 41 and presser foot 83, whereupon hand member 50 moves upward and oscillates to the left, as illustrated in FIG. 22, and feeding bill 85 reciprocates to feed another length of the strip material. Latch mechanism 209, 210 is now disengaged, thus deactivating the drive to clutch 204. During the next approach of feeding bill 85 towards the spindles, cam 185, via clutch 196, causes rotation of the spindles through an angle of about 225°. Hand 50b then engages the ribbon on the spindlehead and the presser spindle retracts, as shown in FIG. 23. The bill then completes its feeding motion and disposes ribbon portion $S_3$ over the spindlehead as shown in FIG. 24 to form a conoidal loop 224 having crossing leg portions disposed atop spindlehead 41. Presser spindle 78 again moves into its ribbon-engaging position and hand 50b retracts as in FIG. 22, whereupon the loop-forming cycle illustrated in FIGS. 22–24 is repeated. Continued operation of the machine repeats the above cycle, whereby successive loops 224 are formed and retained on spindlehead 41. The number of loops 224 included in a single bow depends upon the drive ratio between the timing shafts and drive shaft 24 as aforenoted. These successively formed loops 224 extend downwardly alongside the spindle as indicated in FIG. 4.

The functions of the various fingers on hand member 50b are perhaps best illustrated with reference to FIGS. 20–24 and the above discussion of the bow-forming operation. The fingers 50c define the arcuate clamping portion 50e as is apparent. The top surface of downwardly disposed finger 50g extends well below bill 85 to insure passage of the finger beneath the free end portion $S_1$ of the strip material as a bow-forming subassembly is moved into position I by clockwise (FIG. 2) rotation of spider 36. Thereafter, the strip material between the bill and the spindlehead passes over the upper surface of hand 50b, and more particularly over finger 50f, throughout the bow-forming operation. Finger 50f is of sufficient length, relative to finger 50c and the oscillatory motion of bill 85, to permit fingers 50c to be withdrawn from above the spindlehead, and bill 85 to be oscillated to the right, while finger 50f remains in engagement with the ribbon (see FIG. 23). Finger 50f thus functions as a guide member and supports the ribbon to insure that it will be disposed atop spindlehead 41 and also supports each loop during its formation to prevent its catching on and thereby being looped around a previously formed loop. It will be observed that the finger 50f extends along the edge of the spindlehead over an arc of greater than 90°, when the hand is in clamping position, commencing generally normal to the axis of arm 36a and extending around to a position generally parallel to this arm (see FIG. 2). The clamping action of presser foot 83 moves the portion of the ribbon directly over the spindlehead downwardly to permit fingers 50c to engage and clamp the ribbon against the spindlehead. Upraised finger 50d urges the formed loops downwardly beneath the hand 50b. The body of the hand portion and finger 50f then continues to hold and conform the loops in their downward disposition to insure against their interfering in the formation of subsequent loops. It will thus be appreciated that the configuration and disposition of the fingers of hand member 50 constitutes one significant aspect of this invention.

Subsequent to the deposition of a desired number of loops of ribbon on the carrier spindle, the latch connection at 189, 190 is disconnected to cease further rotations of the spindles, latch 165 is brought into cooperation with arm 160b to halt further reciprocations of the feeding bill, with the feeding bill being held in a position removed from the spindle, hand 50b is rotated and reciprocated into loop-retaining cooperation with spindlehead 41, and the presser spindle is then raised and latched in a raised position by engagement of latch arm 182 with extension 181a. At this stage the loops which will comprise a completed bow have been formed on the spindlehead 41 and are clamped thereon by hand 50b. Ribbon S extends from the last leg of the last loop to and through feeding bill 85.

Cutting mechanism 100 is now rotated, with the scissors open, into the dotted-line position shown in FIG. 2, whereupon the solenoid 103 is actuated, closing the scissors and cutting the ribbon close to spindlehead 41. As the feeding bill is at this time retracted, it will be appreciated that cutting the ribbon at this point leaves a considerable length of free ribbon extending from the feeding bill. This is to be later noted. The cutting mechanism then rotates back to its stand-by position as shown in full lines in FIG. 2. The loops forming a bow are now in position on the spindlehead, clamped between two members which are mounted on spider 36 and which are maintained in clamping position without the aid of any external devices.

Meanwhile, clutch plate 56 is moved downward to clear plates 40, and drive members 64 have been likewise reciprocated downwardly to clear members 47.

With the formed loops clamped on the spindlehead, latch 147 is moved out of engagement with arm 146 and shaft 25 is permitted to rotate through one full revolution. Rotation of shaft 25 in turn causes one full revolution of the Geneva drive arm which rotates the spider one-quarter of a revolution (90°), moving each of the spider subassemblies to the next successive position. Clutch plate 56 then moves into engagement with plate 40 of the spindle which moved into position I, drive member 64 moves into engagement with the member 47 in position I, latch 209–210 closes, latch 189–190 closes, and latches 165 and 182 are released, whereupon the cycle of formation of the loops of a bow on the spindlehead 41 in position I is repeated as above described. During the first reciprocation of feeding bill 85, clamp device 125 is briefly actuated to restrain the movement of the ribbon against the gripping action of finger 87. The length of free ribbon extending from the bill is thus reduced to that minimum length necessary to reach across the spindlehead for beginning the first loop of another bow.

The previously formed bow which has now moved to position II is disposed beneath the stapling apparatus 32. The stapling apparatus is actuated to drive a staple 228 downwardly between fingers 50c and through the superposed crossing layers of ribbon material at the center of the bow on top of spindlehead 41. The concave surface of the spindlehead acts as an anvil to clinch the ends 229 of the staple, after they have passed through the ribbon material, regardless of the relative angular position assumed by the spindle. Hand 50b remains in clamping position atop the bow through this operation, It will be appreciated that one or more automatically operated accessory mechanisms may be provided at position II to lay a length of tie string or other bow mounting means over the accumulated loops, above fingers 50c, prior to insertion of the staple. Less desirably, such mounting means may be hand-inserted by the operator. Application of the staple will then simultaneously secure the mounting or tying means to the loops and secure the loops to one another to form a bow.

Subsequent to the formation of the second bow at position I and the concurrent securing operation at position II, the next rotation of the Geneva drive mechanism moves the spider another 90° whereupon the first bow is moved to position III, the second bow is moved under the stapler, and a third carrier spindle is in position for the formation of another bow in position I. The previously described position I and II operations are then repeated.

Refering now to the operations at positions III (see FIGS. 1 and 13), the arms 106 were depressed to the dotted-line position shown in FIG. 13 by reciprocation of rack 112 prior to the movement of the bow-laden spindle to this position. Operating member 64 now reciprocates upwardly into engagement with member 47, thus raising hand 50b, and then rotates to oscillate hand 50b away from the formed bow (FIG. 2), leaving the bow positioned by its own weight and balanced atop spindlehead 41. Rack 112 is then reciprocated upwardly causing rotation of the arms towards the full-line position shown in FIGS. 1 and 13, whereby the arms pick the bow off the top of spindlehead 41. The bow slides off the arms (to the right in FIG. 1) into a suitable receptacle (not shown). Member 64 then returns to a neutral position and hand 50b returns to its clamping position under the influence of springs 52 and 54.

No operations are carried out in position IV in the present embodiment. Thus, one modification of the present machine, herein contemplated and deemed to be within the scope of this invention, would be to provide a 3-position movement system and a 3-position spider. Alternatively, the functions performed at positions II and III in the present embodiment could be carried out at any of the positions II–IV and further operations, if desired, inserted at the vacant position.

It will be obvious that certain other modifications of the specific embodiment shown may be made in light of the above teachings without departing from the spirit and scope of this invention. For example, a part or all of the guiding functions performed by hand member 50b could be performed by stationary guides, other means may be provided to drive the strip material manipulating bow-forming mechanism, and various other known intermittent feed mechanisms may be substituted for the reciprocating feed bill.

A consideration of the geometry involved in forming and placing the loops or legs of a bow in a given bow design will indicate the angle of rotation of the spindles necessary to form and place the loops. The formation of each loop in the body of the bow illustarted in FIGS. 6–8 requires rotation of the spindles through an angle somewhat greater than 180° but less than 360°. The specified preferred angle of 225° has been found to produce a particularly pleasing symmetrical, balanced and finished appearing bow with about 12 to 15 loops. One possible explanation for this desirable result is that each loop formed subsequent to the formation of the first eight is superposed over a previously formed loop which enhances the tendency of the later formed loops to be positioned along upwardly disposed radii in the generally hemispherical shape defined by the resulting bow. The formation of a 360° central loop completes this general hemispherical shape, provides a pleasing central focal point in the bow, in the general nature of the unopened bud portion of a partially opened flower, and masks any securing means such as staple 228 which would otherwise be visible in the center of the bow.

The strip material for which the illustrated machine is particularly adapted is a non-woven, parallel adhered strand ribbon such as the ribbon product "Satintone" produced and sold by Chicago Printed String Co., of Chicago, Ill. However, the terms "strip material" and "ribbon" as used herein are not intended to be restrictive phrases, but are intended to include any elongated flexible material which can be manipulated and formed in the same general manner as ribbon.

It will thus be seen that an improved bow-forming machine has been provided which substantially eliminates the manual operations in the bow-forming process. Further, the machine is capable of high-volume production, as compared to prior art devices, of individualistic and finished appearing bows which are also stable and thus will withstand a considerable degree of rough treatment without deformation. Additionally, the machine is capable of forming bows from non-woven strip material, including the parallel adhered strand types, without pre-perforation of the material and with a minimum risk of splitting or tearing of the strip material.

It will be appreciated by those skilled in the art that the illustrated machine embodies a combination of operative mechanisms which cooperate to obtain the broader objects set forth herein. At the same time, it will also be appreciated that the disclosure teaches various improved subassemblies which are new and have utility apart from their incorporation in the illustrated over-all combination. For instance, certain of the subassemblies, or their inventive concepts, may be advantageously utilized in bow-forming operations wherein other steps, such as securing the loops together and/or discharging the bows, are manually performed. The improved subassemblies are directed to accomplishing certain of the more specific objects of this invention. In a similar manner, certain of the individual elements which contribute to the meeting of the objects of this invention, particularly the more specific objects, are themselves possessed of novelty and have utility apart from the sub-combinations or the over-all combination illustrated.

While particular embodiments of this invention are shown above, it will be understood, of course, that the invention is not to be limited thereto since many modifications may be made by those skilled in the art in light of the foregoing teachings. It is contemplated, therefore, by the appended claims to cover any such modifications as fall within the true spirit and scope of this invention.

I claim:

1. In a machine adapted for forming bows, the combination of rotatable means for engaging and rotating ribbon fed thereto, intermittent movement feed means for feeding successive lengths of ribbon to said rotatable means to form loops of ribbon thereon, and drive means for actuating said feed means and cooperatively rotating said rotatable means through a predetermined angle of rotation during feeding of one length of ribbon thereto by said feed means and through a different predetermined angle of rotation during feeding of a successive length of ribbon thereto by said feed means.

2. In a machine adapted for forming bows, the combination as in claim 1 wherein said feed means has oscillatory movement when feeding the ribbon to said rotatable means.

3. In a machine adapted for forming bows, the combination of rotatable means for engaging and rotatably supporting ribbon fed thereto, reciprocable feed means for feeding successive lengths of ribbon to said rotatable means to form loops of ribbon thereon, and drive means for reciprocating said feed means and cooperatively rotating said rotatable means through one revolution during one reciprocation of said feed means and through a lesser angle of rotation during a successive reciprocation of said feed means.

4. In a machine adapted for forming bows, the combination of a rotatable spindle, means for rotatably engaging ribbon on said spindle, a shuttle reciprocable towards and away from said spindle for feeding successive lengths of ribbon to said spindle, drive means for rotating said spindle through a predetermined angle of rotation during each of successive reciprocations of said shuttle whereby loops of ribbon are formed on said spindle, said drive means including accessory means for intermittently rotating said spindle through a different angle of rotation during a reciprocation of said shuttle whereby a loop of another angle of rotation is formed on said spindle.

5. In a machine adapted for forming bows, the combination as in claim 4 including means for oscillating said shuttle in a plane transverse to the axis of rotation of said spindle.

6. In a machine adapted for forming bows, the combination as in claim 4 wherein said drive means includes a one-way overrunning clutch drive connected to said spindle.

7. In a machine adapted for forming bows, the combination as in claim 6 wherein said accessory means includes a second one-way overrunning clutch drive connected to said spindle.

8. In a machine adapted for forming bows, the combination as in claim 7 wherein said drive means includes a drive shaft and means operated by said drive shaft for selectively driving said one-way clutches in a predetermined sequence.

9. In a machine adapted for forming bows, the combination as in claim 1 wherein said drive means includes a rotating power source, means for intermittently obtaining rotation of said rotatable means through one predetermined angle of rotation from said power source, additional means for obtaining a different predetermined angle of rotation of said rotatable means from said power source, and means for selectively engaging said additional means between said power source and said rotatable means.

10. In a machine adapted for forming bows, the combination of ribbon engaging means for engaging and rotating ribbon fed thereto, said engaging means including a rotatable spindle, a cooperative opposed presser member reciprocable into engagement with said spindle, and securing means for holding loops of ribbon on said spindle during periods of disengagement of said presser member from said spindle; ribbon feed means independent of said presser member for feeding successive lengths of ribbon to said ribbon engaging means; and drive means for cooperatively rotating said spindle, actuating said feed means and reciprocating said presser member.

11. In a machine adapted for forming bows, the combination as in claim 10 wherein said securing means is adapted for clamping ribbon on said rotatable spindle, and including means for moving said securing means into clamping relation with said spindle for retaining ribbon on said spindle during such disengagement of said presser member.

12. In a machine adapted for forming bows, the combination as in claim 11 wherein said spindle includes a spindlehead having a center portion and a surrounding shoulder, said presser member engaging said center portion when reciprocated towards said spindle; said securing means including a clamping portion adapted to engage said shoulder around said presser member for retaining ribbon on said spindlehead.

13. In a machine adapted for forming bows, the combination of a first rotatable spindle, a reciprocable and rotatable presser spindle disposed in alignment with said first spindle, said spindles including means for gripping ribbon upon reciprocation of said presser spindle toward said first spindle, ribbon feed means for feeding successive lengths of ribbon between said spindles to form successive loops of ribbon, means for holding a plurality of such loops during disengagement of said spindles as said presser spindle is reciprocated, and drive means for cooperatively rotating said spindles, actuating said feed means and reciprocating said presser spindle.

14. In a machine adapted for forming bows, the combination of a first rotatable spindle having a spindlehead surface thereon, a reciprocable and rotatable presser spindle disposed over said surface, means for selectively moving said presser spindle into clamping engagement with said surface for rotatably engaging ribbon thereon, a clamping member mounted for movement into clamping relation with said surface beside said presser spindle for engaging ribbon on said surface, means for moving said member into said clamping relation and maintaining said clamping relation when said presser spindle is retracted from said surface, ribbon feed means for feeding successive lengths of ribbon between said spindles to form successive loops of ribbon, and drive means for cooperatively rotating said spindles, actuating said feed means and reciprocating said presser spindle.

15. In a machine adapted for forming bows, the combination as in claim 14 wherein the portion of said clamping member engaging said spindlehead surface includes a thin clamping portion extending generally parallel to said surface.

16. In a machine adapted for forming bows the combination of a first rotatable spindle having a spindlehead surface thereon, a reciprocable and rotatable presser spindle disposed over said surface, means for selectively moving said presser spindle into clamping engagement with said surface for rotatably engaging ribbon thereon, a clamping member pivotally and reciprocably mounted adjacent said first spindle for movement generally parallel to and into clamping relation with said surface beside said presser spindle for engaging ribbon on said surface, means for moving said member into said clamping relation and maintaining said clamping relation when said presser spindle is retracted from said surface, ribbon feed means for feeding successive lengths of ribbon between said spindles to form successive loops of ribbon, and drive means for cooperatively rotating said spindles actuating said feed means and reciprocating said presser spindle.

17. In a machine adapted for forming bows, the combination of a spindlehead having a ribbon receiving surface, feed means for feeding successive lengths of ribbon across said surface from one edge thereof and in a direction generally parallel to said surface, means for engaging and rotatably retaining ribbon on said surface to form loops of ribbon thereon, a ribbon clamping member mounted for movement into clamping relation with ribbon on said surface, said clamping member including a clamping portion for engaging such ribbon, a guide member normally disposed circumjacent said one edge of said surface, and drive means for cooperatively rotating said spindlehead surface, operating said feed means and moving said clamping member.

18. In a machine adapted for forming bows, the combination as in claim 17 wherein said guide member extends from said clamping member substantially coplanar with said clamping portion.

19. In a machine adapted for forming bows, the combination as in claim 17 including a second guide member disposed generally along another edge of said surface and inclined upwardly from the plane of said clamping portion in a direction opposite to the direction of rotation of said surface.

20. In a machine adapted for forming bows, the combination as in claim 19 wherein both of said guide members extend from said clamping member.

21. In a machine adapted for forming bows, the combination of a rotatable spindle, means for securing ribbon on said spindle for rotation therewith, feed means for feeding successive lengths of ribbon to said spindle to form loops of ribbon thereon while said spindle is in a first position, drive means for actuating said feed means and cooperatively rotating said spindle in said first position, said spindle being movable from said first position to a second position, means for moving said spindle between said positions, means for holding said loops in formed relation on said spindle during movement of said spindle between said positions, and means for applying a retaining device to said ribbon on said spindle in said second position.

22. In a machine adapted for forming bows, the combination as in claim 21, including a second rotatable spindle cooperatively movable between said positions.

23. In a machine adapted for forming bows, the combination as in claim 21 wherein said spindle is mounted for movement from said second position to a third position, and removal means for removing said loops from said spindle at said third position.

24. In a machine adapted for forming bows, the combination as in claim 23 including second and third rotatable spindles mounted for cooperative movement between said positions by said further drive means.

25. In a machine adapted for forming bows, the combination as in claim 21 wherein said holding means includes a clamping member movable between said positions with said spindle, said clamping member being movable into clamping relation with ribbon on said spindle, and means for maintaining said clamping member in clamping relation with such ribbon on said spindle as said spindle is moved between positions.

26. In a machine adapted for forming bows, the combination as in claim 21 wherein said spindle is movable to a third position and said further means is adapted to move said spindle to at least such three positions, and including removal means for removing bows from said spindle in said third position.

27. In a machine adapted for forming bows, the combination as in claim 21 wherein said feed means includes a ribbon guide having a passage for passing ribbon longitudinally therethrough and to said spindle means, said guide being disposed with the longitudinal axis of said passage oriented substantially transversely of the axis of rotation of said spindle in said first position and with one end of said passage adjacent said spindle in said first position.

28. In a machine adapted for forming bows, the combination of a support, a plurality of spindles rotatably mounted on said support, drive means for moving said support and thereby moving said spindles successively to a plurality of predetermined positions, engaging means including means for rotatably retaining ribbon fed to said spindles, feed means for feeding successive lengths of ribbon to a spindle disposed in a first of said positions, further drive means for rotating a spindle in said first position and operating said feed means to form loops of ribbon on said spindle, means for applying a retaining device to ribbon on a spindle in a second of said positions to retain said loops in a bow, and removal means for removing bows from said spindles.

29. In a machine adapted for forming bows, the combination as in claim 28 including at least three of said spindles mounted on said support, said support being movable by said drive means to move said spindles through at least three predetermined positions, and said removal means being disposed to remove bows from said spindles in a third position.

30. In a machine adapted for forming bows, the combination as in claim 28 wherein said engaging means includes a reciprocably driven presser foot disposed to engage ribbon on a spindle in said first position and separate holding means for holding said loops in formed relation during movement of said spindles from said first position to said second position.

31. In a machine adapted for forming bows, the combination as in claim 30 wherein said presser foot is rotatably mounted, said presser foot being reciprocable into clamping engagement with ribbon disposed on said spindle in said first position and rotatable with said spindle.

32. In a machine adapted for forming bows, the combination as in claim 28 wherein said engaging means includes a holding member supported on said support adjacent each of said spindles, each of said holding members including a clamping portion movable into clamping relation with ribbon on the adjacent spindle, and means for moving said clamping portion into clamping relation with the adjacent spindle.

33. In a machine adapted for forming bows, the combination as in claim 32 wherein each of said holding members includes a first ribbon guide member disposed circumjacent the side of the top of a spindle oriented toward said feed means in said first position, and a depending guide member having its upper end substantially coplanar with said first guide member and inclined downwardly therefrom in the direction of movement of said support.

34. In a machine adapted for forming bows, the combination of a rotatable turret, a plurality of spindles rotatably mounted on said turret, each of said spindles having a substantially flat, clear, spindlehead surface, intermittent movement drive means for rotating said turret and thereby moving said spindles successively to a plurality of predetermined positions, feed means for feeding successive lengths of ribbon to said surface of a spindle disposed in a first of said positions, a presser member reciprocably and rotatably mounted above a spindle in said first position, means selectively driving said presser member into clamping engagement with ribbon on said surface, a clamping member supported on said turret adjacent each of said spindles, each of said clamping members including a clamping portion cooperative with said surface beside said presser member to clamp ribbon on said surface, means for moving said clamping members into ribbon clamping relation with said surfaces and maintaining said clamping relation during movement from said first position to a second position, drive means for reciprocating said presser member, rotating a spindle in said first position and operating said feed means to form loops of ribbon on said surface of said spindle, securing means for applying a retaining device to ribbon on said surfaces at said second position to secure said loops in a bow, and means for removing bows from said spindles.

35. In a machine adapted for forming bows, the combination as in claim 34 wherein said securing means comprises a stapler for applying spaced prong staples to said ribbon and each of said surfaces includes an anvil surface for cooperation with said stapler to secure said staples.

36. In a machine adapted for forming bows, the combination as in claim 34 wherein the drive means for rotating a spindle in said first position includes means for rotating said spindle through a full revolution during feeding of one length of ribbon thereto by said feed means and through a different predetermined angle of rotation during feeding of a successive length of ribbon thereto by said feed means.

37. In a method of forming bows from ribbon, the steps comprising engaging one end portion of a length of ribbon on a spindlehead surface; maintaining a second portion of said ribbon, spaced from said end, in substantially parallel-planar relation with said end; supporting the ribbon at a point between said portion; rotating said end, relative to said second portion, about an axis generally normal to the plane of support of said end on said surface; engaging said second portion on said spindlehead in adjacent parallel-planar relation to said end portion to form a first loop; maintaining a succeeding portion of said ribbon, spaced from said second portion, in substantially parallel-planar relation with said second portion; supporting the ribbon at a point between said second and succeeding portions; rotating the engaged portions and the formed loop, relative to said suceeding portion, about said axis; engaging said succeeding portion on said spindlehead in adjacent parallel-planar relation to said second portion to form a second loop; repeating the steps recited for forming said second loop to form a plurality of loops similar to said second loop; and securing the engaged portions together to form a bow.

38. In a method of forming bows from unperforated ribbon, the step recited in claim 37 wherein said portions are engaged on said surface in unperforated condition.

39. In a method of forming bows, the steps recited in claim 37 wherein said end is rotated about 360° relative to said first portion in forming the first loop and the engaged portions and the formed loop are rotated through a lesser angle relative to the succeeding portion for forming the second and succeeding loops.

40. In a method of forming bows from ribbon, the steps comprising engaging one end portion of a length of ribbon on a spindlehead surface; maintaining a second portion of said ribbon, spaced from said end, in substantially parallel-planar relationship with said end; rotating said end relative to said second portion, about an axis generally normal to the plane of support of said end on said surface; cooperatively oscillating said second portion through one cycle of oscillation transversely of said surface and transversely of the longitudinal axis of said second portion while rotating said end; engaging said second portion on said spindle head in adjacent parallel-planar relation to said end portion to form a first loop; maintaining a succeeding portion of said ribbon, spaced from said second portion, in substantially parallel-planar relation with said second portion; rotating the engaged portions and the formed loop, relative to said succeeding portion, about said axis; cooperatively oscillating said succeeding portion through one cycle of oscillation transversely of said surface and transversely of the longitudinal axis of said succeeding portion while rotating said engaged portions and formed loop; engaging said succeeding portion on said spindle head in adjacent parallel-planar relation to said second portion to form a second loop; repeating the steps recited for forming said second loop to form a plurality of additional loops; and securing the engaged portions together to form a bow.

41. In a method of forming a bow from ribbon, the steps comprising engaging one end portion of a length of ribbon; gripping a second portion of said ribbon spaced from said end; rotating said end portion, relative to said second portion, through an angle of about 360° around an aixs of rotation generally normal to the plane of support of said end portion, and positioning and engaging said second portion in adjacent, parallel-planar, face to back relation to said end portion to form a closed loop; gripping a succeeding portion of said ribbon spaced from said second portion; rotating the engaged portions and the formed loop, relative to said succeeding portion, through an angle greater than 180° and less than 360° around said axis and positioning and engaging said succeeding portion in adjacent, parallel-planar, face to back relation to said second portion to form a conoidal second loop; repeating the steps recited for forming said second loop to form a succession of loops similar to said second loop around said closed loop from successive portions of said ribbon; and securing the adjacent parallel-planar portions of said ribbon together to form a bow.

42. In a method of forming a bow from ribbon, the steps comprising engaging one end portion of a length of ribbon; maintaining a second portion of said ribbon, spaced from said end, in substantially parallel-planar relation with said end portion; rotating said end portion, relative to said second portion, through an angle of about 360° around an axis of rotation generally normal to the plane of support of said end portion, and positioning and engaging said second portion in adjacent parallel-planar relation to said end portion to form a closed loop; maintaining a succeeding portion of said ribbon, spaced from said second portion, in substantially parallel-planar relation with said second portion; rotating the engaged portions and the formed loop, relative to said succeeding portion, through an angle greater than 180° and less than 360° around said axis and positioning said succeeding portion in adjacent parallel-planar relation to said second portion to form a conoidal second loop; repeating the steps recited for forming said second loop to form a succession of loops similar to said second loop around said closed loop from successive portions of said ribbon; and securing the adjacent parallel-planar portions of said ribbon together to form a bow.

43. In a method of forming a bow from ribbon, the steps comprising engaging one end portion of a length of ribbon atop a spindlehead oriented on a vertical axis; maintaining a second portion of said ribbon, spaced from said end, in substantially parallel-planar relation with said end portion; rotating said end portion, relative to said second portion, through an angle of about 360° around an axis of rotation generally normal to the plane of support of said end portion on said spindlehead, and engaging said second portion on said spindlehead in adjacent parallel-planar relation to said end portion to form a closed loop depending from said spindlehead; maintaining a succeeding portion of said ribbon, spaced from said second portion, in substantially parallel-planar relation with said second portion; rotating the engaged portions and the formed loop, relative to said succeeding portion, through an angle greater than 180° and less than 360° around said axis; engaging said succeeding portion on said spindlehead in adjacent parallel-planar relation to said second portion to form a conoidal second loop; repeating the steps recited for forming said second loop to form a succession of loops similar to said second loop around said closed loop from successive portions of said ribbon; and securing the engaged portions of said ribbon together to form a bow.

44. In a machine adapted for forming bows, the combination as in claim 1 wherein said drive means is adapted to rotate said rotatable means through one revolution during the feeding of one length of ribbon by said feed means and through a lesser angle of rotation during the feeding of each successive length of ribbon for forming a bow.

45. In a machine adapted for forming bows, the combination of a rotatable spindle having a substantially flat, clear spindlehead surface, feed means for feeding successive lengths of ribbon over said surface, a rotatable presser member movable into clamping engagement with ribbon on said surface to retain ribbon on said surface as said spindle is rotated, means for clamping ribbon on said surface during periods of disengagement of said presser member from said spindle, means for cooperatively rotating said spindle, actuating said feed means and moving said presser member and said clamping means to form loops of ribbon on said spindle, and means for applying a retaining device to ribbon on said surface to secure said loops in a bow.

References Cited

UNITED STATES PATENTS 2,933,233  4/1960  Kravig et al. _____ 223—46
2,982,452  5/1961  Anderson _____ 223—46

JORDAN FRANKLIN, Primary Examiner.

G. V. LARKIN, Assistant Examiner.